United States Patent
Kinoshita et al.

(10) Patent No.: US 8,588,038 B2
(45) Date of Patent: Nov. 19, 2013

(54) OPTICAL PICKUP

(75) Inventors: Yasushi Kinoshita, Hitachinaka (JP); Souichirou Yamada, Yokohama (JP); Takeshi Oikawa, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/428,561

(22) Filed: Mar. 23, 2012

(65) Prior Publication Data

US 2013/0083635 A1   Apr. 4, 2013

(30) Foreign Application Priority Data

Sep. 30, 2011   (JP) .................................. 2011-217588

(51) Int. Cl.
  *G11B 11/00* (2006.01)
(52) U.S. Cl.
  USPC ...................... 369/13.14; 369/112.01; 360/59
(58) Field of Classification Search
  USPC ......... 369/30.01, 112.01, 112.23, 100, 44.11, 369/44.37, 13.14, 13.12; 248/683; 29/458; 310/156.14; 360/59
  See application file for complete search history.

(56) References Cited

U.S. PATENT DOCUMENTS

| | | | |
|---|---|---|---|
| 6,944,929 B2 * | 9/2005 | Ogawa et al. | 29/458 |
| 7,423,357 B2 * | 9/2008 | Takahashi et al. | 310/156.14 |
| 2010/0315184 A1 | 12/2010 | Morimoto et al. | |
| 2013/0043371 A1 * | 2/2013 | Morimoto et al. | 248/683 |

FOREIGN PATENT DOCUMENTS

| | | |
|---|---|---|
| JP | 62-202626 U | 12/1987 |
| JP | 1-85915 U | 6/1989 |
| JP | 2011-018428 A | 1/2011 |

* cited by examiner

*Primary Examiner* — Ali Neyzari
(74) *Attorney, Agent, or Firm* — Mattingly & Malur, PC

(57) ABSTRACT

An optical pickup has a laser light source, beam splitter, collimator lens, reflection mirror, objective lens and photo detector are mounted in a case. An objective lens actuator includes a magnetic member and magnet. The optical pickup may become contaminated by uncured adhesive remaining at the edges of the adhesive surfaces of the magnet and the magnetic member that is transferred to the optical pickup via finger cots or tweezers, etc. In an adhesion step between the magnet and the magnetic member, in which part of a groove near to the center of the surface has a small depth and part of the groove near to the outer circumference of the surface has a large depth, an adhesive is drawn toward the center of the surface of the magnetic member by a capillary phenomenon and is prevented from spreading along the outer edge of the surface.

6 Claims, 6 Drawing Sheets

OPTICAL PICKUP

CLAIM OF PRIORITY

The present application claims priority from Japanese patent application serial No. 2011-217588 filed on Sep. 30, 2011, the content of which is hereby incorporated by reference into this application

BACKGROUND OF THE INVENTION

1. Field of the Invention

The present invention relates to an optical pickup.

2. Description of the Related Art

As a related art of the present technical field, Japanese Patent Application Publication No. 2011-18428 is mentioned.

In this Patent Application Publication, it is described that a magnetic member can be surely adhered to a magnetic connecting member by providing an adhesive force securing part for securing an adhesive strength in either or both of the magnetic member and the magnetic connecting member.

In the aforementioned Patent Application Publication, a structure for securing the adhesive strength between a magnetic member (magnet) and a magnetic connecting member (magnetic member) is described. However, in the structure of the Patent Application Publication, an uncured adhesive is likely to remain at the edges of the adhesive surfaces of the magnet and the magnetic member. Accordingly, the uncured adhesive is transferred to finger cots or tweezers, etc., in the handling in and after an adhesion step. Further, the uncured adhesive is transferred again to other parts by handling the parts with the finger cots or tweezers, etc., to which the uncured adhesive has been adhered, thereby causing the parts, etc., to be contaminated.

Thus, an uncured adhesive contaminates various parts via finger cots or tweezers, etc., and hence optical pickups are finally contaminated, thereby sometimes causing the cases where a yield ratio is decreased due to a trouble in optical performance or an appearance defect.

An object of the present invention is to provide an optical pickup in which generation of an uncured adhesive can be reduced.

SUMMARY OF THE INVENTION

The aforementioned object can be achieved by an optical pickup comprising a magnet that forms a magnetic field and a magnetic member that holds the magnet, in which the magnetic member has a shape in which a groove is formed on a surface of the magnetic member, to which the magnet is to be fixed, and part of the groove near to the center of the surface has a small depth and part of the groove near to the outer circumference of the surface has a large depth.

Alternatively, in order to achieve the aforementioned object, it is preferable that the groove in the magnetic member is a two-stage groove having two depths different from each other.

Alternatively, in order to achieve the aforementioned object, it is preferable that the groove in the magnetic member is a tapered groove.

Alternatively, in order to achieve the aforementioned object, it is preferable that the groove in the magnetic member is a groove whose corner has been chamfered.

Alternatively, in order to achieve the aforementioned object, it is preferable that the cross section of the part of the groove near to the outer circumference of the surface of the magnetic member has a triangular shape.

According to the present invention, an optical pickup produced at a high yield ratio can be provided.

Problems, configurations, and advantages, other than what have been described above, will be made clear by the following description of embodiments.

DETAILED DESCRIPTION OF THE PREFERRED EMBODIMENTS

Hereinafter, embodiments will be described with reference to the accompanying drawings.

Embodiment 1

In the present embodiment, an example of an optical pickup in which transfer of an adhesive can be prevented will be described.

Figure 1:
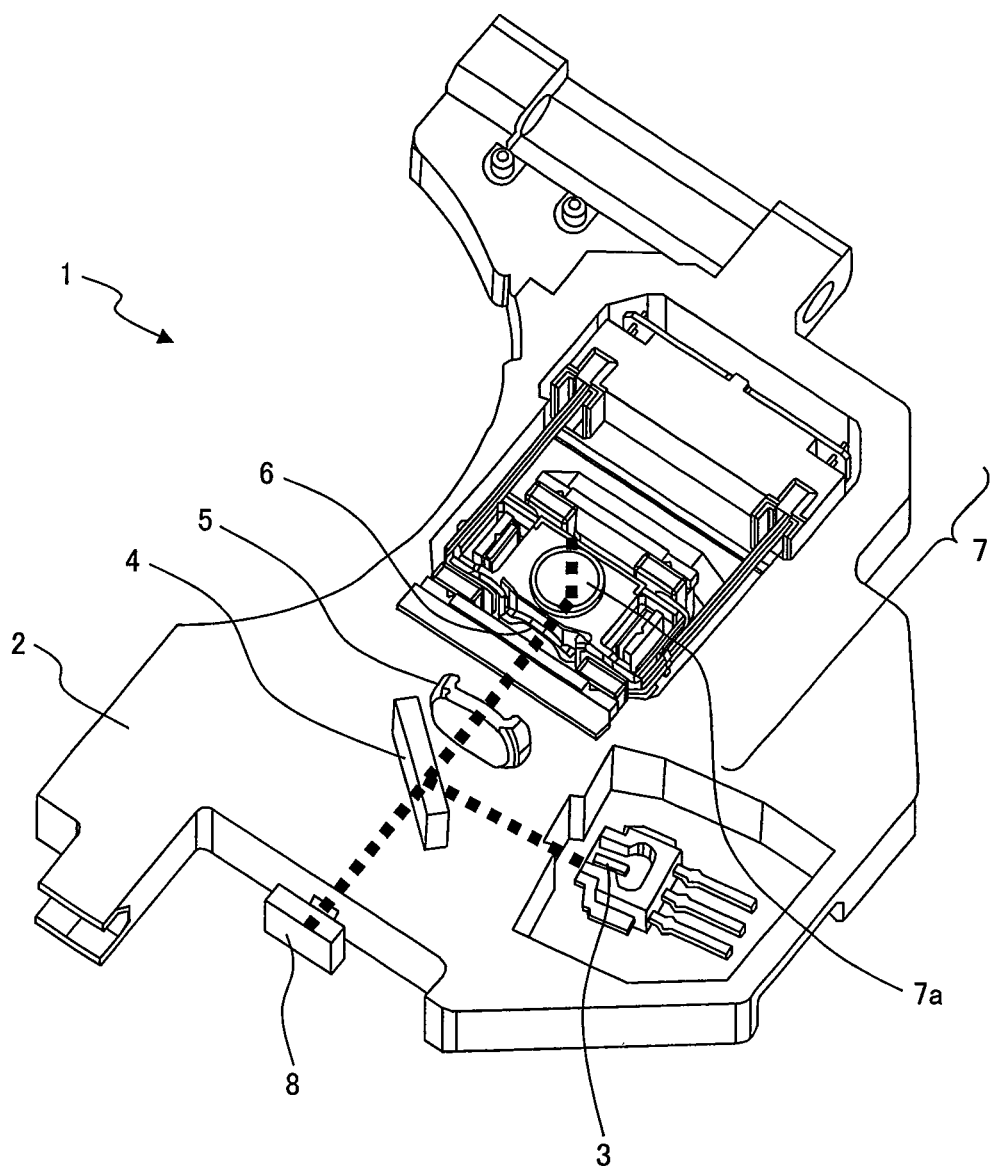
FIG. 1 is a perspective view of an optical pickup according to the present invention.

FIG. 1 illustrates an example of the configuration of the optical pickup according to the present embodiment.

Reference Numeral 1 indicates an optical pickup, 2 a case, 3 a laser light source, 4 a beam splitter, 5 a collimator lens, 6 a reflection mirror, 7 an objective lens actuator, 7a an objective lens, and 8 a photo detector.

The optical pickup 1 has a configuration in which the laser light source 3, the beam splitter 4, the collimator lens 5, the reflection mirror 6, the objective lens 7a, and the photo detector 8 are mounted in the case 2. The configuration of the optical pickup 1 in FIG. 1 illustrates the minimum configuration. Alternatively, the optical pickup 1 may have a configuration in which a plurality of each of the aforementioned parts are mounted in the case 2 in order to deal with a plurality of optical disc specifications, such as CD, DVD, and BD (Blu-ray Disc).

The case 2 is a base member in which optical parts are mounted. Because a complicated shape is needed, the case 2 is mainly formed by molding a metal or resin. The laser light source 3 is a semiconductor laser element for emitting a laser beam of a specific wavelength. The beam splitter 4 is an optical part for dividing the laser beam into transmitted light and reflected light. For example, the beam splitter 4 is either a prism formed by pasting two rectangular prisms together or a mirror in which an optical film has been formed on a glass plate. The collimator lens 5 is an optical lens for converting diverging light of the laser beam into parallel light.

The reflection mirror 6 is a mirror for totally reflecting the laser beam. Because the reflection mirror 6 is to be bent in the direction from the inside of the case 2 of the optical pickup 1 toward a non-illustrated optical disc, the mirror is installed in an inclined manner. The objective lens actuator 7 is an electromagnetic actuator for driving the objective lens 7*a*. The objective lens 7*a* is a lens for converging the parallel light of the laser beam onto the recording surface of the optical disc. The photo detector 8 is a photoelectric transducer for generating an electrical signal in accordance with an amount of the laser beam emitted onto the detection surface.

Operations of the optical pickup according to the present embodiment will be described.

A laser beam emitted from the laser light source 3 reaches the collimator lens 5 after reflected by the beam splitter 4 followed by conversion into parallel light. Further, the laser beam is totally reflected into the direction toward the optical disc by the reflection mirror 6 and then forms a beam spot by being converged onto the recording surface of the optical disc with the objective lens 7*a*. In the optical pickup 1, information is recorded/reproduced on/from the optical disc by this beam spot.

In the recording, the beam spot is turned on/off by turning on/off the laser light source 3 based on recorded information, thereby allowing the information to be written by forming a recorded pit on the optical disc. In the reproduction, the beam spot is focused onto the recorded pit of the optical disc to receive, with the objective lens 7*a*, a laser beam reflected by the recorded pit. Conversely to the outward route, the laser beam passes through the reflection mirror 6, the collimator lens 5, and the beam splitter 4 in this order and is finally guided onto the detection surface of the photo detector 8. The photo detector 8 reads the information by on/off of the laser beam focused onto the detection surface.

Hereinafter, the objective lens actuator 7 according to the present embodiment will be described.

Figure 2:
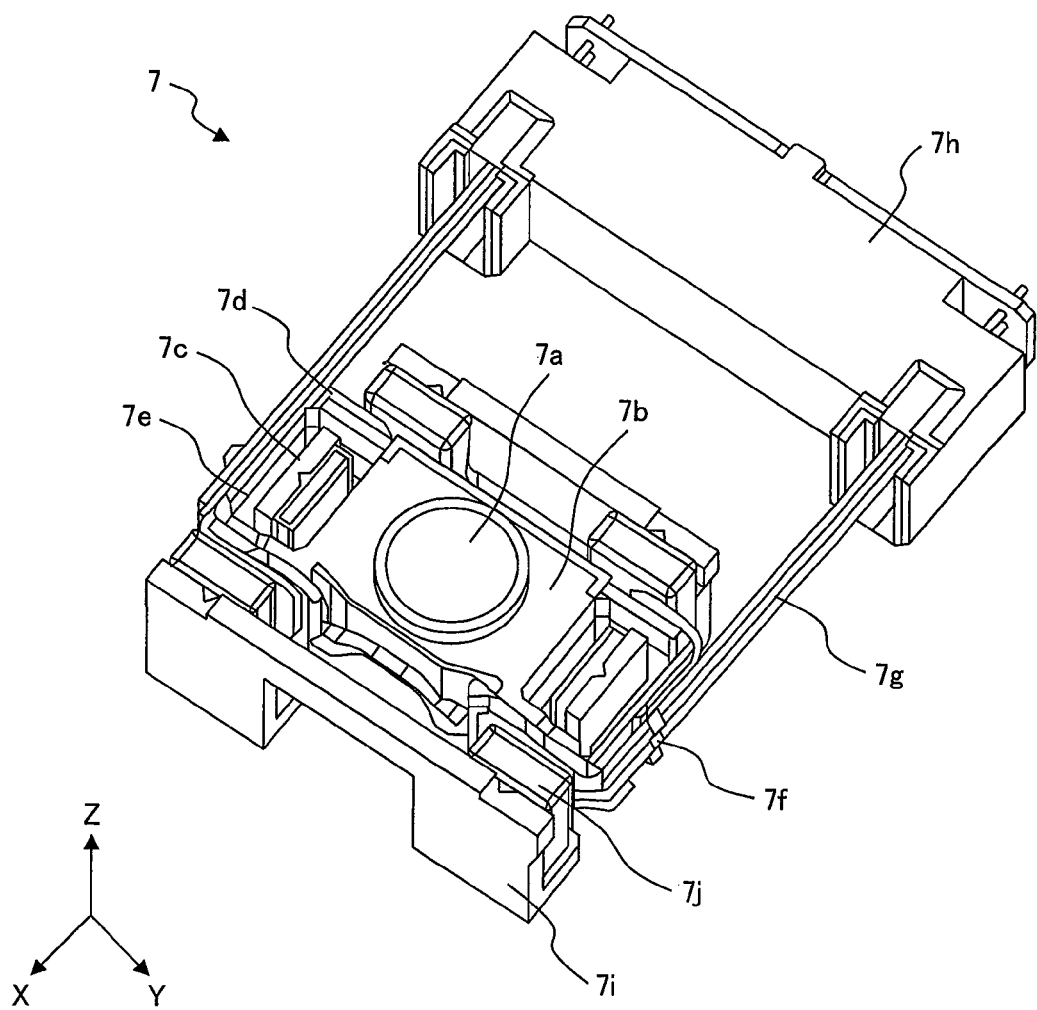
FIG. 2 is a perspective view of an object lens actuator according to the invention.

FIG. 2 is a view illustrating an example of the configuration of the objective lens actuator according to the present embodiment.

Reference Numeral 7 indicates the objective lens actuator, 7*a* an objective lens, 7*b* a lens holder, 7*c* a focusing coil, 7*d* a tracking coil, 7*e* a tilt coil, 7*f* a connection substrate, 7*g* a suspension wire, 7*h* a base holder, 7*i* the magnetic member, and 7*j* the magnet. Z direction in the view is a focusing direction in which the objective lens 7*a* is made to be near to or away from the non-illustrated optical disc, Y direction is a tracking direction in which the objective lens 7*a* is operated in the radial direction of the optical disc, and X direction is a tilt direction in which the objective lens 7*a* is rotated around an axis orienting X direction.

The objective lens 7*a* is mounted on the upper surface of the lens holder 7*b*. The focusing coil 7*c* and the tilt coil 7*e* are formed with Z direction being a winding axis, so that they are attached to the lens holder 7*b*. The tracking coil 7*d* is formed with X direction being a winding axis, so that it is attached to the side surface of the lens holder 7*b*, which is perpendicular to X axis. The connection substrate 7*f* is attached to both side surfaces of the lens holder 7*b*, which are perpendicular to Y axis.

One end of the suspension wire 7*g* is connected to the connection substrate 7*f* and the other end thereof is connected to the base holder 7*h* by using solder, etc., so that the lens holder 7*b* is supported, operationally with respect to the base holder 7*h*, by three suspension wires 7*g* on either side of the lens holder 7*b*, i.e., by totally six suspension wires 7*g*. The end of each of the focusing coil 7*c*, tracking coil 7*d*, and tilt coil 7*e* is connected to the connection substrate 7*f* by using solder, etc., so that they are electrically connected to the corresponding suspension wires 7*g* on the connection substrate 7*f*.

By supplying a current to each coil through the suspension wire 7*g*, an electromagnetic action occurs between the magnetic member 7*i* and a magnetic field made by the magnet 7*j* that has been attached to the magnetic member 7*i*, so that driving force in each direction is generated, thereby allowing the lens holder 7*b* to be driven.

Hereinafter, an adhesion step between the magnet and the magnetic member according to the present embodiment will be described.

Figure 3:
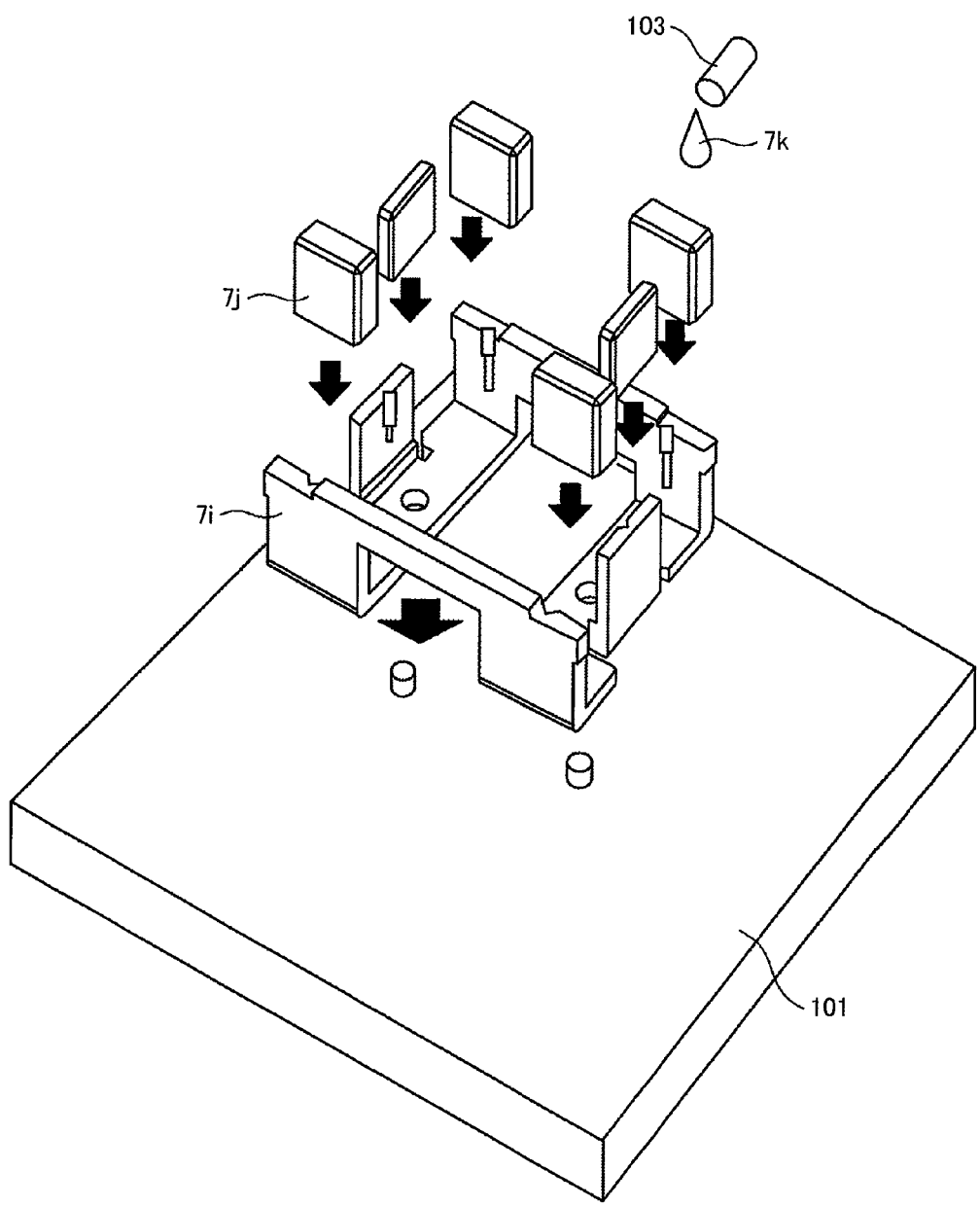
FIG. 3 is a view illustrating an adhesion step between a magnet and a magnetic member according to the invention.

FIG. 3 is a view illustrating the adhesion step between the magnet and the magnetic member according to the present embodiment.

Figure 4:
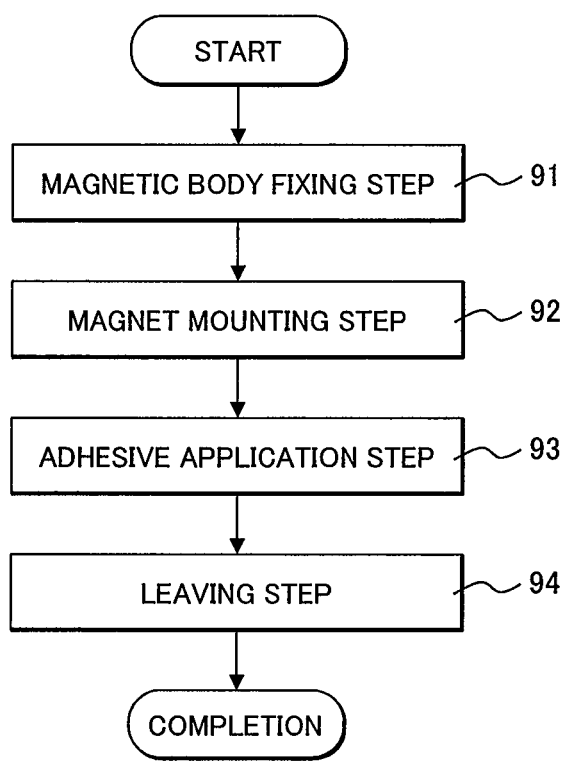
FIG. 4 is a flowchart illustrating the adhesion step between the magnet and the magnetic member according to the invention.

FIG. 4 illustrates an example of a flowchart of the adhesion step between the magnet and the magnetic member according to the present embodiment.

In a magnetic member fixing step 91, the magnetic member 7*i* is fixed to a jig 101. The fixation to the jig 101 is performed by fitting a position determination hole formed on the bottom surface of the magnetic member 7*i* with a position determination pin of the jig 101. The magnet member 7*i* can be surely fixed by pressing hold or adoption by a magnet in order for the magnetic member 7*i* not to elevate from the jig 101.

In a magnet mounting step 92, the magnet 7*j* is loaded into the magnetic member 7*i*. The magnet 7*j* is positioned by a non-illustrated jig 102 to be loaded at a predetermined position in the magnetic member 7*i*. The jig 102 may be removed after loading the magnet 7*j*. In the case, the magnet 7*j* can maintain its position because the magnet 7*j* itself is adsorbed to the magnetic member 7*i* by its own magnetic force.

In an adhesive application step 93, an adhesive 7*k* is applied, by a dispenser 103, toward the contact surfaces of the magnet 7*j* and the magnetic member 7*i*. An application amount and an application position in the application of the adhesive 7*k* can be accurately controlled by using the dispenser 103. The adhesive 7*k* is required to be low in viscosity in order to infiltrate into a gap sandwiched by the magnet 7*j* and the magnetic member 7*i*. Also, it is needed that the adhesive 7*k* is cured in the gap sandwiched by the magnet 7*j* and the magnetic member 7*i*, and hence it is convenient to use an anaerobic adhesive.

In a leaving step 94, the magnet 7*j* and the magnetic member 7*i* are left as they are until the adhesive 7*k* is cured. It is needed to leave them as they are because the curing time of the adhesive is as long as several hours.

Hereinafter, a problem to be solved by the present embodiment and a means for solving it will be described.

Figure 5:
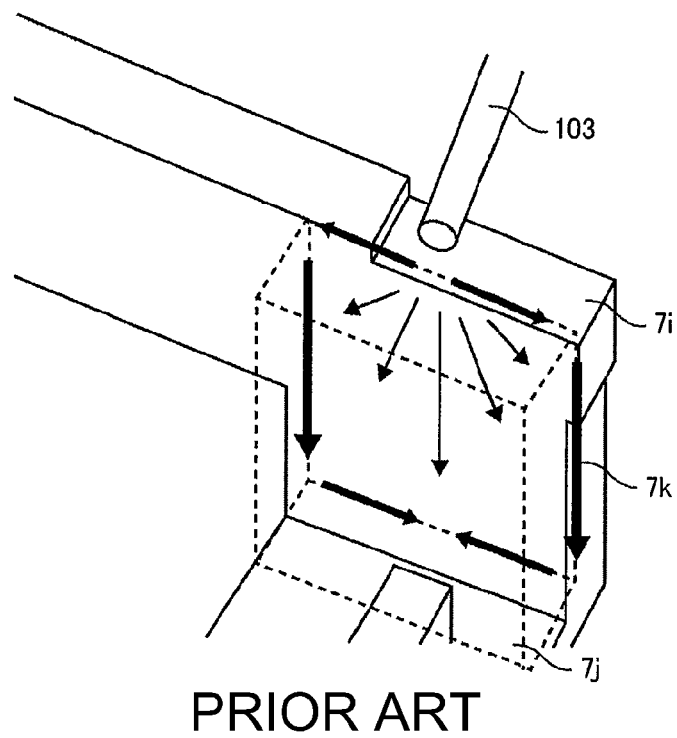
FIG. 5 is a view illustrating a state in which a magnetic member and a magnet according to a conventional technique are adhered together.

FIG. 5 is a view illustrating a state in which a magnetic member and a magnet according to a conventional technique are adhered together.

The conventional magnetic member 7*i* has a flat surface to which the magnet 7*j* is to be fixed. In the aforementioned Patent Application Publication, reticulate grooves are provided on the flat surface; however, the same action as what will be described below occurs. The magnet 7*j* is brought into surface-to-surface contact with the flat surface of the magnetic member 7*i*.

In the adhesive application step 93, the adhesive 7*k* is applied to the outer edges of the contact surfaces of the magnet 7*j* and the magnetic member 7*i*. The adhesive 7*k* infiltrates into a gap between the contact surfaces of the magnet 7*j* and the magnetic member 7*i*, and some of the adhesive 7*k* flows along the outer edges of the contact surfaces. An anaerobic adhesive used as the adhesive 7k is progressively cured in an area not in contact with air, but is not cured in an area in contact with air. Accordingly, the adhesive 7k that flows along the outer edges of the contact surfaces of the magnet 7j and the magnetic member 7i is not sometimes cured even after the leaving step 94.

In an assembly step in and after the leaving step 94, if the uncured adhesive 7k is transferred to finger cots or tweezers, etc., in handling an assembly of the magnet 7j and the magnetic member 7i, the uncured adhesive 7k is transferred again to the jigs or parts, which have been handled since then, thereby causing the jigs or parts to be contaminated. Thus, the uncured adhesive 7k contaminates various parts via finger cots or tweezers, etc. , and hence optical pickups 1 are finally contaminated, thereby sometimes causing the cases where a yield ratio is decreased due to a trouble in optical performance or an appearance defect.

Figure 6:
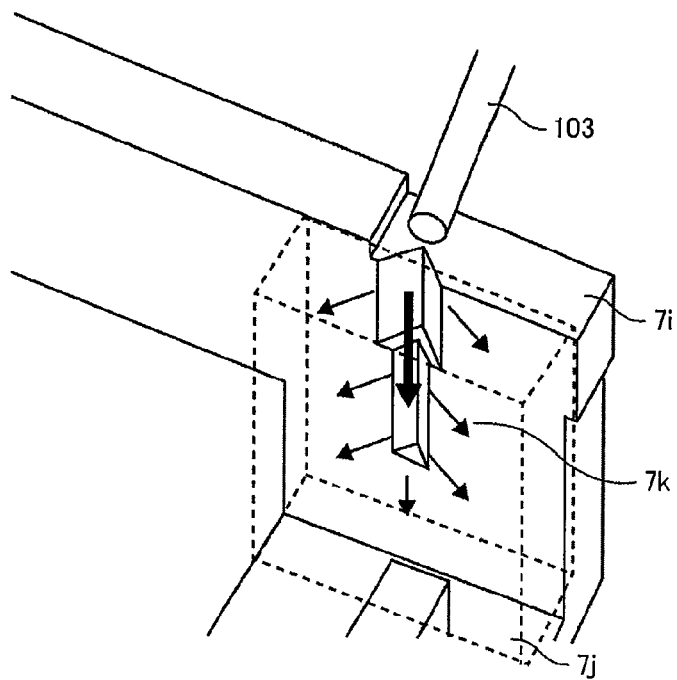
FIG. 6 is a perspective view illustrating an adhesion state between the magnetic member and the magnet according to an embodiment of the invention.

FIG. 6 is a view illustrating a state in which a magnet and a magnetic member according to the present embodiment are adhered together.

In the magnetic member 7i according to the present embodiment, a V-shaped groove is formed on a flat surface to which the magnet 7j is to be fixed. The V-shaped groove is a two-stage V-shaped groove in which part of the V-shaped groove near to the center of the contact surface, to which the magnet 7j is to be fixed, has a small depth and the other part of the V-shaped groove near to the outside of the contact surface has a large depth. The V-shaped groove in the magnetic member 7i can be easily achieved by forming a protrusion on a press die, which is not greatly changed from a conventional production method. The magnet 7j is brought into surface-to-surface contact with the flat surface of the magnetic member 7i, in the same way as that of a conventional structure. At the time, a hole is formed by both the magnet 7j and the V-shaped groove in the magnetic member 7i.

In the adhesive application step 93, the dispenser 103 is positioned by bringing the needle tip of the dispenser 103 into contact with the hole to apply the adhesive 7k. The shape of the hole becomes triangular by making the groove have a V-shape, and hence it becomes easy to support the needle of the circular dispenser 103 at two points, thereby allowing for easy positioning of the needle. In addition, it becomes easy to fit the needle tip into the edge of the hole formed of the magnet 7j and the V-shaped groove by forming the V-shaped groove so as to have approximately the same size as the diameter of the needle.

With these advantages, the reproducibility of an application position can be improved. The applied adhesive 7k is drawn, by a capillary phenomenon, toward the center of the contact surface on which the V-shaped groove having a small depth has been formed, thereby the adhesive 7k hardly remaining near the inlet port of the hole to which the adhesive 7k has been applied. Thereby, it can be prevented that some of the adhesive 7k may flow along the outer edges of the contact surfaces of the magnet 7j and the magnetic member 7i.

Further, because the adhesive 7k drawn toward the center infiltrates into a gap between the magnet 7j and the magnetic member 7i so as to spread from the inside of the gap, the adhesive 7k is not exposed to a place that is contacted at handling. Because the transfer of the uncured adhesive 7k and contamination thereby, occurring via finger cots or tweezers, are prevented, defects can be reduced.

As stated above, by the characteristics of the present embodiment, an optical pickup produced at a high yield ratio can be provided.

Embodiment 2

In the present embodiment, a variation of an optical pickup will be described in which transfer of an adhesive can be prevented.

Figure 7:
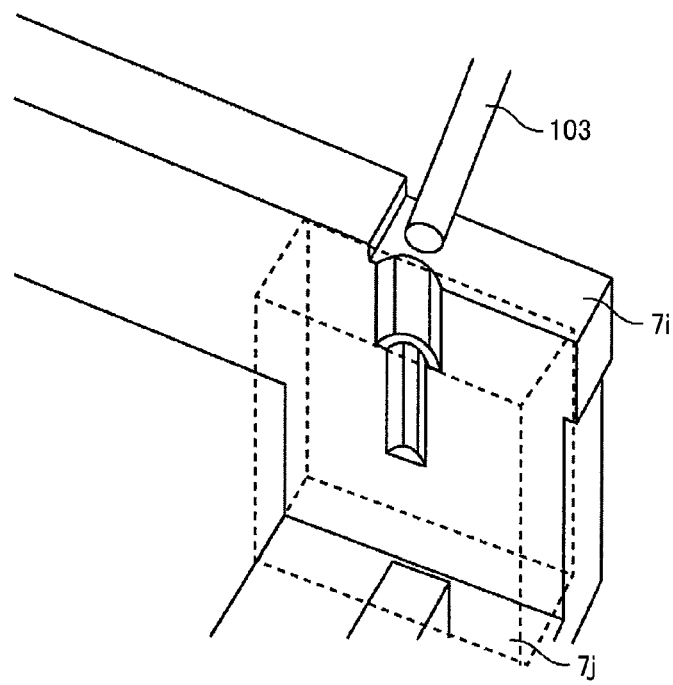
FIG. 7 is a perspective view illustrating a shape of a magnetic member according to another embodiment of the invention.

FIG. 7 illustrates a variation of the shape of a magnetic member according to the present embodiment. The configuration and operations of the magnetic member 7i, other than the shape thereof, are the same as those of Embodiment 1.

When the adhesive 7k is applied to a hole formed by the magnet 7j and the V-shaped groove in the magnetic member 7i, the adhesive 7k is drawn toward the center by a capillary phenomenon; however, the adhesive 7k sometimes remains at and around the corner of the V-shaped groove. Because of contact with air, it is difficult for the adhesive thus remaining to be progressively cured, and hence the adhesive remains as uncured adhesive 7k.

Accordingly, the magnetic member 7i according to the present embodiment is processed such that the corner of the V-shaped groove is subjected to round chamfer. With such processing, the adhesive 7k is no longer sandwiched between the walls that form the corner, and hence the adhesive hardly remains.

By preventing the adhesive 7k from remaining in the groove in the magnetic member 7i, as in the present embodiment, defects can be reduced, and hence an optical pickup produced at a high yield ratio can be provided.

Embodiment 3

In the present embodiment, a variation of an optical pickup will be described in which transfer of an adhesive can be prevented.

Figure 8:
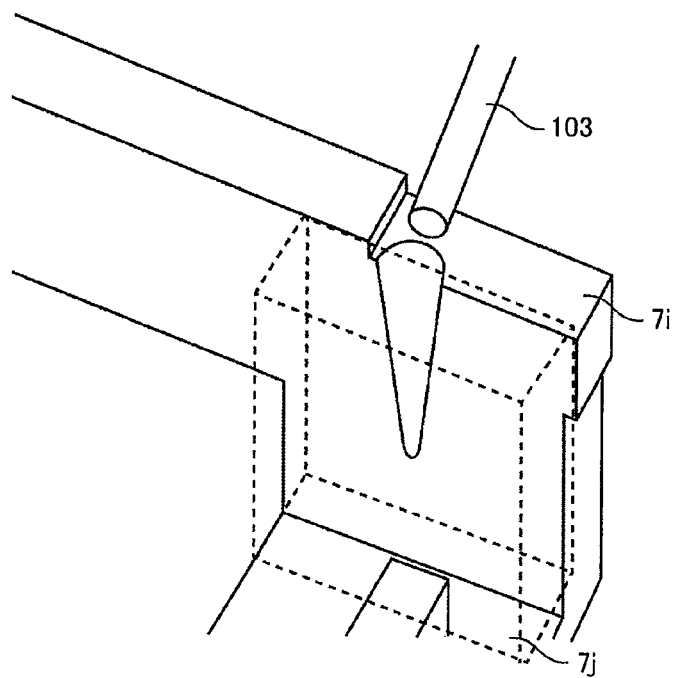
FIG. 8 is a perspective view illustrating a shape of a magnetic member according to still another embodiment of the invention.

FIG. 8 illustrates a variation of the shape of a magnetic member according to the present embodiment.

The configuration and operations of the magnetic member 7i, other than the shape thereof, are the same as those of Embodiment 1.

In the shape in which a groove in the magnetic member 7i is formed to have two stages, a step is created at the joint of the two stages, and hence an adhesive sometimes remains at and around the step. Accordingly, a taper is provided in a groove in the present embodiment. The tapered groove has a shape in which there is no step and in which part of the groove near to the center of the contact surface, to which the magnet 7j is to be fixed, has a small depth and part of the groove near to the outside of the contact surface has a large depth.

By forming the groove in this way, it can be prevented that an adhesive may remain at and around a step. The groove also provides the advantage that the adhesive 7k is likely to be drawn inward by a capillary phenomenon. An amount of the uncured adhesive 7k that remains at and around the groove can be further reduced by the shape of the magnetic member 7i according to the present embodiment.

By preventing the adhesive 7k from remaining in the groove in the magnetic member 7i, as in the present embodiment, defects can be reduced, and hence an optical pickup produced at a high yield ratio can be provided.

The present invention should not be limited to the aforementioned embodiments and includes various modifications. For example, the aforementioned embodiments have been described in detail for easy understanding of the invention, and hence the invention should not be necessarily limited to embodiments each comprising all of the described configurations. In addition, it is possible to replace part of a configuration of an embodiment with a configuration of another embodiment, or to add a configuration of an embodiment to that of another embodiment. It is also possible that part of a configuration of each embodiment is added, deleted, or replaced with/by another configuration thereof.

What is claimed is:

1. An optical pickup, comprising:
a magnet that forms a magnetic field for an electromagnetic actuator that is magnetically held to a contact surface of a magnetic member that holds the magnet,
an adhesive provided from a dispenser to a gap between the magnet and the magnetic member to adhere the magnet and the magnetic member,
a groove provided on the contact surface of the magnetic member which provides the adhesive to the gap between the magnet and the magnetic member,
the cross section of said groove being larger at an outer edge portion than an inner center portion of the contact surface.

2. An optical pickup according to claim 1,
wherein the cross section of said groove at the outer edge portion is nearly the same as a size of the dispenser at a tip portion.

3. An optical pickup according to claim 1,
wherein the shape of the cross section of the groove is V-shaped.

4. The optical pickup according to claim 1, wherein
the groove in the magnetic member is a two-stage groove having two depths different from each other.

5. The optical pickup according to claim 1, wherein
the groove in the magnetic member is a tapered groove.

6. The optical pickup according to claim 1, wherein
the groove in the magnetic member is a groove having a corner that is chamfered.

* * * * *